United States Patent
Book et al.

(10) Patent No.: US 10,472,029 B2
(45) Date of Patent: Nov. 12, 2019

(54) SYSTEM AND METHOD FOR GENERATING DYNAMIC MAPS FOR BODIES OF WATER

(71) Applicants: Gregory Ward Book, Atlanta, GA (US); Dawn Lea Davis, Atlanta, GA (US)

(72) Inventors: Gregory Ward Book, Atlanta, GA (US); Dawn Lea Davis, Atlanta, GA (US)

(*) Notice: Subject to any disclaimer, the term of this patent is extended or adjusted under 35 U.S.C. 154(b) by 525 days.

(21) Appl. No.: 15/082,868

(22) Filed: Mar. 28, 2016

(65) Prior Publication Data

US 2016/0318589 A1 Nov. 3, 2016

Related U.S. Application Data

(60) Provisional application No. 62/140,230, filed on Mar. 30, 2015.

(51) Int. Cl.
 *B63B 49/00* (2006.01)
 *G06T 11/00* (2006.01)

(52) U.S. Cl.
 CPC ............ *B63B 49/00* (2013.01); *G06T 11/001* (2013.01); *G06T 2207/10032* (2013.01); *G06T 2207/30181* (2013.01)

(58) Field of Classification Search
 USPC ........................................................ 345/589
 See application file for complete search history.

(56) References Cited

U.S. PATENT DOCUMENTS

| | | | | |
|---|---|---|---|---|
| 8,717,387 | B1* | 5/2014 | Brewington | G06T 3/0068 345/630 |
| 2003/0225621 | A1* | 12/2003 | Nurcahya | G06Q 30/02 705/14.19 |
| 2006/0080029 | A1* | 4/2006 | Kodani | G01C 21/32 701/420 |
| 2006/0268664 | A1* | 11/2006 | Lewis | A01K 79/02 367/139 |
| 2007/0143019 | A1* | 6/2007 | Feyen | G08B 21/10 702/5 |
| 2007/0294722 | A1* | 12/2007 | Kang | G06Q 30/02 725/34 |
| 2011/0213515 | A1* | 9/2011 | Haymart | G01C 21/00 701/21 |
| 2012/0089381 | A1* | 4/2012 | Chu | G01W 1/00 703/6 |
| 2012/0232719 | A1* | 9/2012 | Salmon | G05D 1/0206 701/2 |
| 2013/0132198 | A1* | 5/2013 | Park | G06Q 30/0261 705/14.54 |
| 2013/0179267 | A1* | 7/2013 | Lee | G06Q 30/0267 705/14.64 |

(Continued)

*Primary Examiner* — Jason C Olson

(57) ABSTRACT

Methods and system for creating dynamic maps are disclosed. A system for map creation for bodies of water may comprise an application server associated with a plurality of navigation devices, wherein the application server is configured to: (a) receive data from said plurality of navigation devices, the data including water-site information, time, and location; (b) perform statistical analysis on the data received by said plurality of devices; (c) determine the existence of bodies of water based at least on the statistical analysis; and (d) generate a dynamic map including one or more of water depth charts and heat maps based at least on the statistical analysis.

12 Claims, 7 Drawing Sheets

(56) References Cited

U.S. PATENT DOCUMENTS

| | | | |
|---|---|---|---|
| 2013/0204705 A1* | 8/2013 | Song | G06Q 30/0261 |
| | | | 705/14.58 |
| 2013/0286377 A1* | 10/2013 | Heege | G01S 11/14 |
| | | | 356/4.07 |
| 2014/0032479 A1* | 1/2014 | Lauenstein | G06F 17/30241 |
| | | | 707/602 |
| 2014/0222572 A1* | 8/2014 | Ryu | G06Q 30/0261 |
| | | | 705/14.58 |
| 2015/0032545 A1* | 1/2015 | Chen | G06Q 30/0261 |
| | | | 705/14.58 |
| 2015/0278867 A1* | 10/2015 | Lerman | G06Q 30/0261 |
| | | | 705/14.58 |
| 2015/0371267 A1* | 12/2015 | Porat | G06O 30/0257 |
| | | | 705/14.55 |
| 2017/0314221 A1* | 11/2017 | Watson | E02B 7/34 |

* cited by examiner

- 500 — First water-site information may be received from a first device.
- 502 — Second water-site information may be received from a second device.
- 504 — A water depth model may be generated based on at least the first water site information and the second water site information.
- 506 — A dynamic map may be generated based on at least the water depth model.
- 508 — An activity model is generated indicating wildlife activity associated with the water site.
- 510 — A feature model is generated indicating an environmental feature associated with the water site.
- 512 — A dynamic map may be transmitted to a user device configured to display the dynamic map via a user interface.

Figure 5

SYSTEM AND METHOD FOR GENERATING DYNAMIC MAPS FOR BODIES OF WATER

The present application claims priority to U.S. application 62/140,230, filed Mar. 30, 2015, the entirety of which is incorporated herein by reference.

BACKGROUND

Current water based maps are static and often out dated. Hardcopy maps of bodies of water may indicate water boundaries and depths that are not representative of the changing conditions of the waterway. These and other shortcomings of the prior art are addressed by the present disclosure.

SUMMARY

The present disclosure relates to systems and methods for generating maps of bodies of water. In certain aspects, the system and methods uses crowd-sourced data to create waterway depth charts, heat maps of water or activity conditions, heat maps of wildlife, including non-native or invasive species of animals, and amenities on or near bodies of water.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings:

FIG. 5 illustrates an example method in accordance with aspects of the disclosure.

DETAILED DESCRIPTION

The present disclosure provides a system and method for creation of a body of water map. In certain embodiments, a system may comprise of a plurality of navigation devices and an application server to receive from the plurality of navigation devices time series of location and value points. From this information, water maps may be generated based on the time series of location and value points. A body of water may be a lake, a river, an ocean, a swamp, a pond, or any other navigable or non-navigable body of water. In certain embodiments, a method may comprise: receiving location and value points from plurality of navigation devices, along with respective time stamps indicating the time of recordation of each of the location and value points; identifying body of water features according to the location and value points and respective time stamps; and creating a body of water map based on the location and value points and respective time stamps; the body of water map comprised of depth, hazards, water conditions, water-side amenities, wildlife locations, invasive wildlife locations, traffic conditions.

The disclosure provides a system and method for direct advertising by merchants to boaters on or near a body of water. The method comprising receiving location and time points for boaters on or near a body of water and displaying this information to merchants. The method comprising of merchants creating a "Blast" notification that is received by boaters on or near a body of water on the boater's navigation device.

Figure 1:
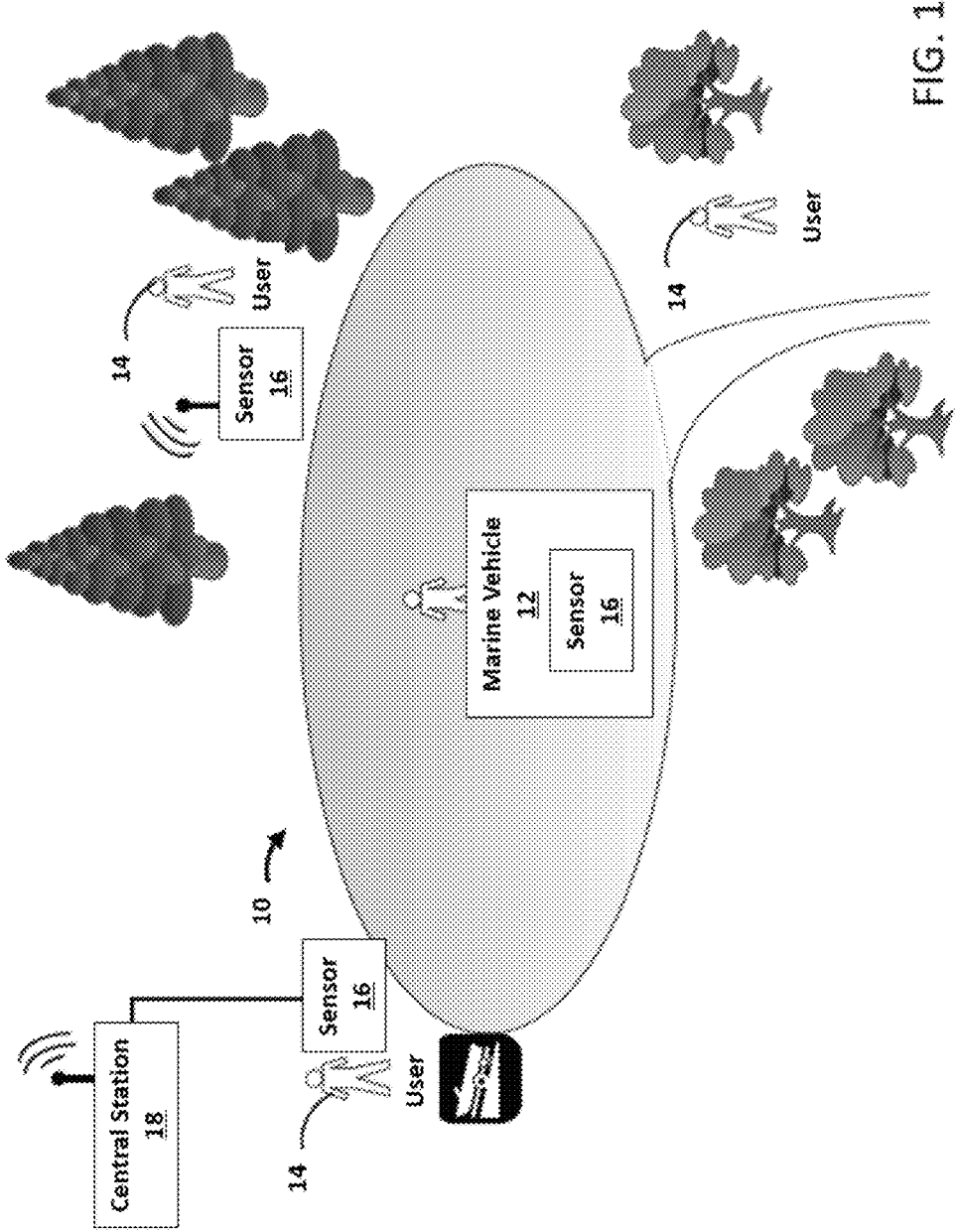
FIG. 1 illustrates an exemplary water-site in accordance with aspects of the disclosure.

FIG. 1 shows a body of water or water-site 10 such as, for example, a lake, a river, an ocean, a swamp, a pond, or any other navigable or non-navigable body of water. Various marine vehicles 12, such as boats, may operate at or near different locations of the water-site 10. Users 14 may operate such marine vehicles. Additionally, or alternatively, the users 14 may navigate on or near the water-site 10 using other motive means such as walking, driving, biking, swimming, kayaking, etc.

The users 14 may use sensors 16 a video camera, infrared sensor, thermal sensor, audio recorder, RADAR sensor, SONAR sensor, LIDAR sensor, optical sensor, wave sensor, ultrasonic sensor, pH sensor, oxygen sensor, chemical sensor or the like to capture information relating to the water-site 10. As an example, the sensors 16 may be disposed on the marine vehicle 12. Additionally, or alternatively, the sensors 16 may be configured to capture information relating to the water-site 10 independent of one or more of the users 14 and the marine vehicles 12. The information captured via the sensors 16 may be transmitted to a processor such as the central station 18 by way of wireless communication (such as the communication channels defined herein).

Figure 2:
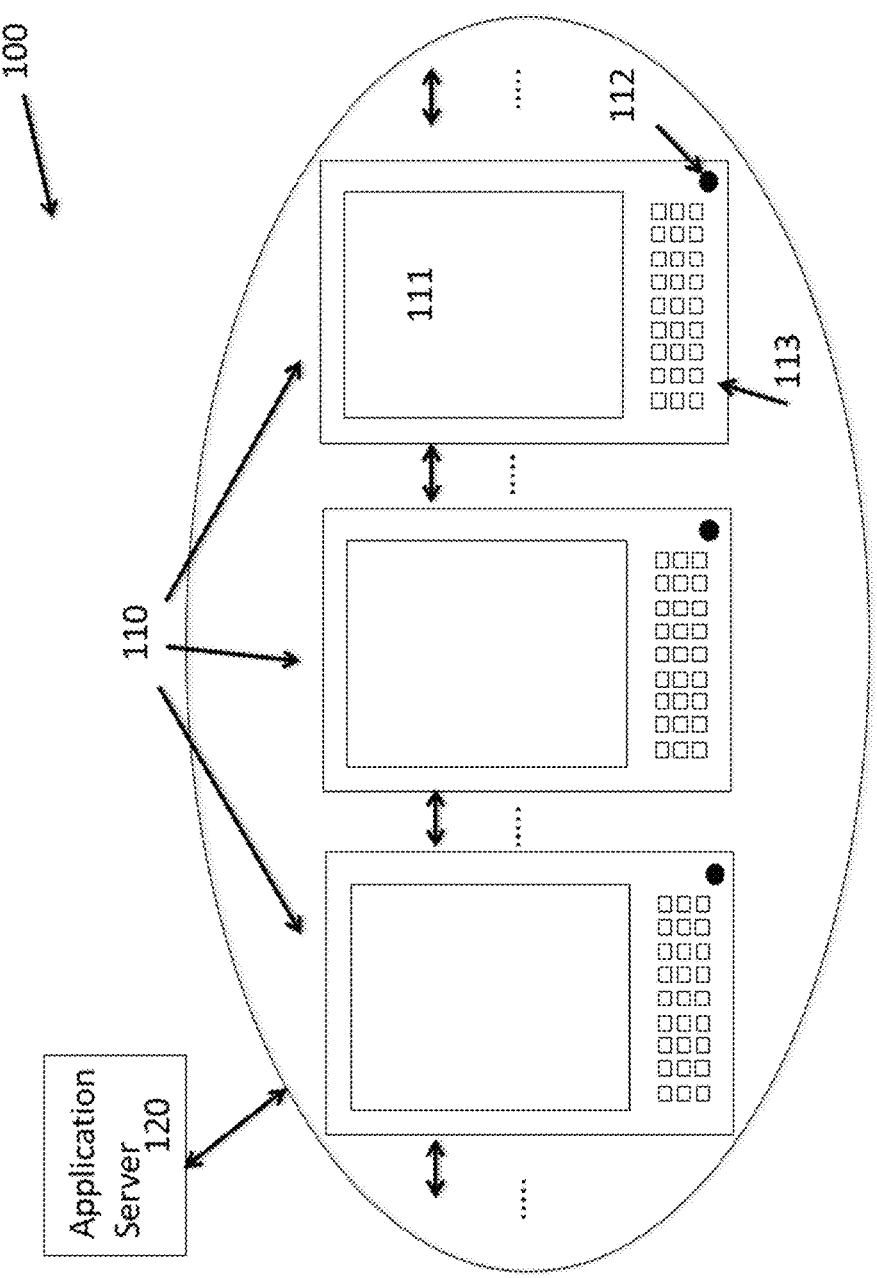
FIG. 2 illustrates a system in accordance with aspects of the disclosure.

Reference is now made to FIG. 2, which is a schematic illustration of a system 100. The system 100 may include a plurality of navigation devices 110. Each of the navigation devices 110 may be configured to communicate with a mapping service which may be provided by the system 100. The navigation devices 110 may include, for example, mobile phones, personal data assistants (PDA), personal navigation devices (PND), GPS devices, mobile computers, boat computers or any suitable device capable to receive and manipulate and/or operate navigation software and/or device capable of identifying its own location and time and either store or send the location, and any sensor which may sense and record its location and time. In certain aspect, the navigation devices 110 may be or comprise one or more of the sensors 16 (FIG. 1). The plurality of navigation devices 110 with connectivity capability may be in communication with an application server 120 (e.g., central station 18 (FIG. 1)), for example, by cellular network or wireless network or satellite network or any other mobile communication means.

The application server 120 may receive from one or more of the navigation devices 110, for example, periodically, momentary locations of the navigation devices 110. The application server 120 may collect and/or record a time series of locations received from navigation devices 110 along with time stamps indicating the time at which each location was recorded. The navigation devices 110 may collect user inputted pins representing, for example, water hazards, stumps, water depth water conditions, weather conditions, wildlife activity, invasive wildlife sightings, fishing activity, boating traffic activity, and water side amenities such as, for example, boat ramps, boat docks, parks, bath rooms, gas stations, restaurants, bars and/or other businesses The navigation devices 110 may collect user input via text input 113, voice input 112 or touch screen input 111.

The application server 120 may receive from one or more navigation devices 110, for example, time and location stamps associated with respective navigation devices 110. As an example, the time stamps and location stamps may be processed to generate virtual markers (e.g., pins). Such markers may be displayed on a dynamic map. The markers may also be associated with data such as water information including, for example, water depth, wave height, tidal information, water temperature, water clarity, water current and water chemistry.

The application server 120 may be configured to process data to perform-analysis on data received by plurality of navigation devices 110 to create dynamic models of water depth, depth change, environmental features and wildlife activity. Environmental features may include submerged sand bars, shallow or un-navigable water, channels, hazardous areas, underwater hazard areas, diving areas, choppy water, "crowded" areas where many boaters can be found. Wildlife activity may include fish and animal schooling, fish spawning, bird and animal migrations, invasive wildlife intrusion and animal locations.

It is understood that water depth changes regularly in bodies of water. In the present systems and methods, water depth pins have a time stamp associated with them. The application server 120 can compare the value of newly inputted water depth pins to the value of older water depth pins at the same geolocation, and subsequently adjust the water height for an entire body of water. Bodies of water such as reservoirs may provide lake height information in the form of feet above or below pool stage, for example. Water depth pins can be associated with the published lake height data and adjusted accordingly as new lake height data is published. The displayed lake depth charts are changed to account for adjustments in published lake height data.

On bodies of water where tide data is available, the tide value is associated with the depth pin. When the tide value changes, the depth associated with the pin is adjusted by subtracting or adding the change in tide height. The entire depth chart in a defined region around that depth pin is adjusted.

In certain aspect, data received by the application server 120 or other computing device may be stored as records in a database. The data may be received from the devices 110 in a crowd-sourced manner and/or may be received from other sources of information, such as government repositories, third-party data stores, and the like. For example, records may be created representing water information at particular times, wherein each record has an associated time stamp. Further, the records may be compared to information received from an agency record such as a government agency. A graphical map may then be created based on the records in the database. For example, certain graphical representation may be associated with certain records to build a full map of a water-site and the surrounding area. A context map may be loaded to provide satellite imagery of a given area including the water-site. However, the graphics representing water may be overlaid on the satellite imagery or other background based upon the location information in the records. As records are updated, the map may be updated. As changes are recognized in the records for a given location over time, graphics may be used to illustrate the change. For example, if a water level is increasing due to rainfall or tide, or the like, a gradient may be displayed instead of a solid color. Other graphics may be used to illustrate a dynamic map of a water-site. Alternatively, or additionally, the dynamic map may include the display of markers or graphical pins associated with the individual records in the database. As such, a map may be loaded or created for a given region and overlaid with graphical pins representing each of the records in the database within a given geolocation and/or time period.

Figure 3:
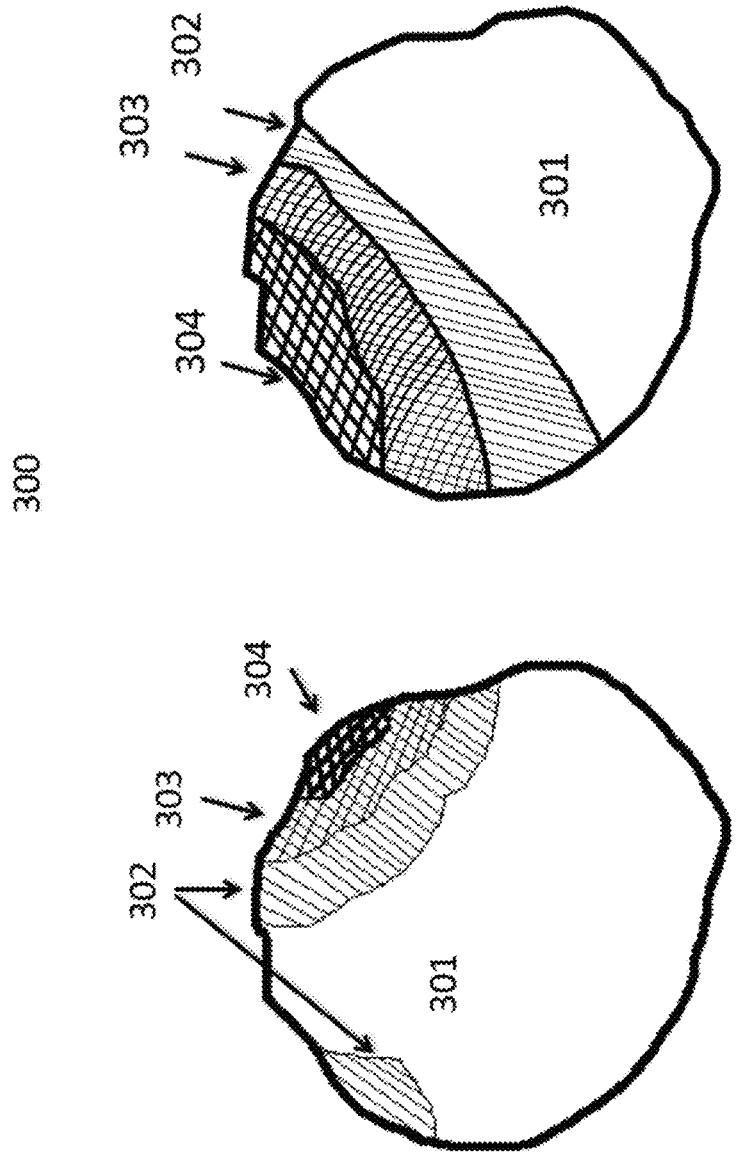
FIG. 3 illustrates an example model in accordance with aspects of the disclosure.

The application server 120 may use data received by the plurality of navigation devices 110 to create dynamic heat maps of, for example, fishing activity, water conditions, wildlife sightings, invasive wildlife sightings, and/or boat traffic. As an example of such a heat map, FIG. 3 illustrates example graphical models 301, 302, 303 and 304 indicating increasing levels of probability of occurrence of a particular observance for any particular heat map over separate periods of time. For pin activities associated with fish caught and wildlife sightings, the time and location associated with the pin can be used to chart locations of fish and wildlife as a function of time, as displayed in FIG. 3.

As an example, if fishermen are catching largemouth bass on one side of a lake, but not on the other side of the lake, the map that is generated will illustrate by means of color or rendering that one side of the lake is "hotter" than the other for catching that particular type of fish. As a further example, if python hunters see more pythons on one side of the everglades compared to the other side, the heat map will display one side of the everglades to have a higher density of pythons than the other side by way of color or rendering.

For pin activities associated with water conditions and boating traffic, the device 110 can display heat maps generated by the application server 120. After a defined period of time, the pin is marked as deleted and a deletion entry is made in the database. The application server 120 may observe time and location information of device 110, recognizing when device moves from one body of water to another through an area of a map identified as land and correct the map accordingly to represent that path as being water. The information received from navigation devices 110 of hikers and/or bikers may contribute, for example, to creation of hiking and/or biking trails, in methods similar to the methods described above.

In certain aspects, the application server 120 may include or be in communication with a database of the received information from the devices 110. As an example, the records in the database may be associated with pins (locations on the dynamic map). Such pins may be related to water conditions, user/boat traffic, wildlife commission officers' locations, and the like. Certain records may have a time to live, whereby the record is deleted from the database after a predetermined time period has expired. As an example, the application server 120 can review the database on a period or continuous schedule to check for changes in the records and/or for certain types of records. As an example, if the application server 120 locates the records (eg. Pin) with Type as Game Officer or Traffic Pin, the server 120 may mark the record as deleted if it has already been 1 hour, for example, since it was last create/modified. A corresponding log entry may also be made in the database. As a further example, if the application server 120 locates a record with Type as Water Conditions, it marks that record as deleted if it has already been 2 hours, for instance, since it was last created/modified. A corresponding log entry may also be made in the database. Various record types and associated time periods for deletion may be used.

Figure 4:
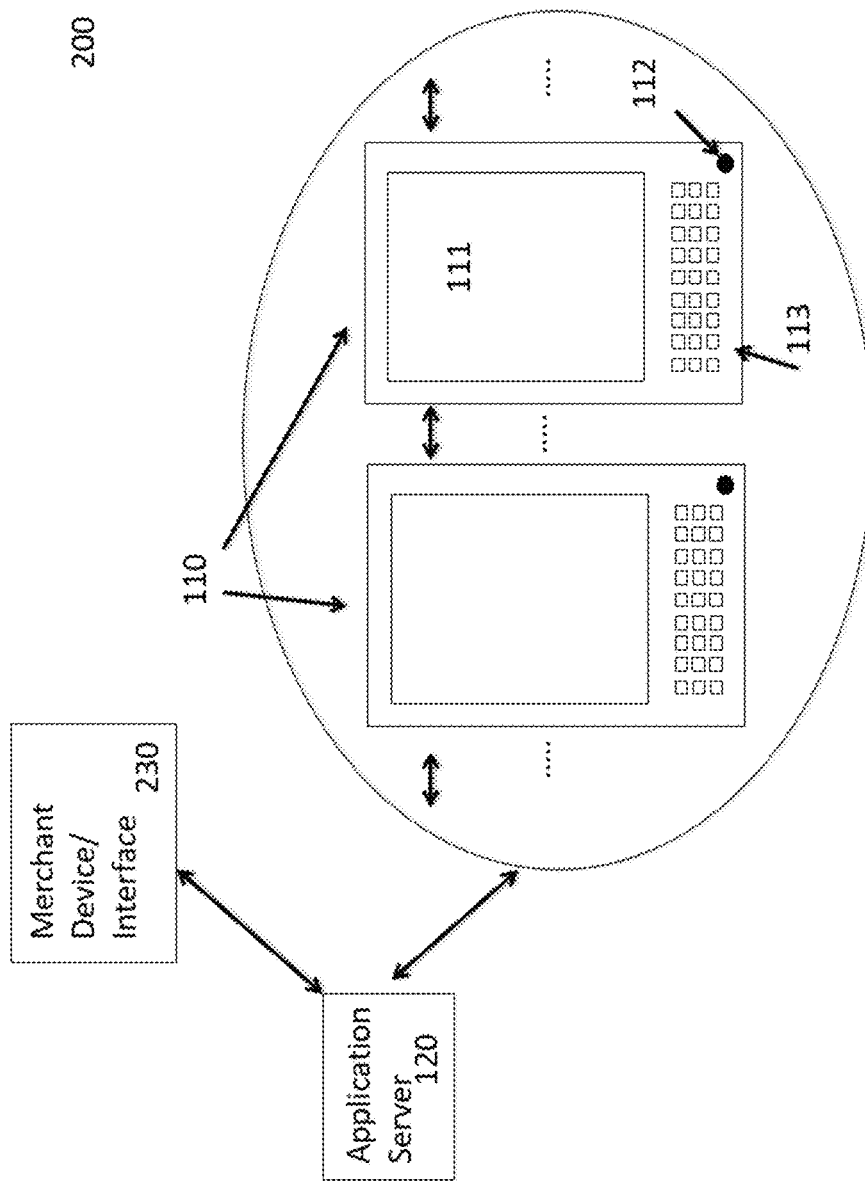
FIG. 4 illustrates a system in accordance with aspects of the disclosure.

Reference is now made to FIG. 4, which is a schematic illustration of a system 200. System 200 may include a plurality of navigation devices 110 and a plurality of merchant devices 230. Merchant devices may include computers, servers, mobile phones, PDAs, and/or a device capable of establishing connectivity with the internet.

Merchant device 230 may broadcast to a plurality of navigation devices 110 with customized messages through the application server 120. A message may be an announcement, a coupon, a special offer and/or any other communication that displays on the navigation device 110. Navigation device 110 may receive, display and store the Blast for a set period of time. Merchants may input data such as title, description, image, start time and end time for a message. The data inputted by the merchant is received by the server. The merchant account is checked for sufficient funds, and if there are sufficient funds, the amount of the newly inputted message is deducted from the available funds in the merchant account. The data from the merchant announcement is entered into a data table with a start time associated with it. The server checks the table at set time intervals, say one minute for example. If any such announcement is found in the table, the server retrieves the business information for the business associated with the announcement. The server then retrieves all of the users that have made the body of water their favorite or whose devices are currently geolocated on the body of water. The announcement is then downloaded to the devices. Once the announcement is downloaded, the entry in the table is marked as inactive.

The application server 120 may display the number and location of navigation devices 110 based on the geolocation of device 110 on the application server 120 website such that merchant device 230 can determine the number of devices on or near a particular body of water.

FIG. 5 illustrates a flow diagram for an example method for dynamic map generation relating to a water-site. At step 500, first water-site information may be received from a first device. The first water-site information may comprise a first time marker indicating a time the first water-site information was captured, a first location marker indicating a location of the first device at the time the first water-site information was captured, and a first water parameter associated with the water-site.

FIG. 5 illustrates a flow diagram for an example method for dynamic map generation relating to a water-site. At step 500, first water-site information may be received from the first device. The first water-site information may comprise a first time marker indicating a time the first water-site information was captured, a first location marker indicating a location for the first device at the time the first water-site information was captured, and a first water parameter associated with the water-site.

At step 502, second water-site information may be received from a second device. The second water-site information may comprise a second time marker indicating a time the second water-site information was captured, a second location marker indicating a location of the second device at the time the second water-site information was captured, and a second water parameter associated with the water-site.

At step 504, a water depth model may be generated based on at least the first water-site information and the second water-site information. The water-depth model may be a collection of depth information relating to multiple locations on a water-site. For example, the water-depth model may include database records indicating static depth and/or depth change at or over a period of time. The water-depth model may be referenced in generating a graphical representation of the water-site, wherein the depth may be indicated by a graphical element. For example, depth may be indicated by a map pin or by a different color or gradient.

At step 506, a dynamic map may be generated based at least on the water depth model, wherein the dynamic map indicates at least a water depth of a portion of the water-site and a change in water depth over a time period.

At step 508, an activity model may be generated indicating wildlife activity associated with the water-site, wherein generating the dynamic map is based at least on the activity model and the dynamic map indicates wildlife activity at a static time or over a time period, or both. The wildlife activity may comprise animal schooling, fish spawning, bird and animal migrations, invasive wildlife intrusions, or animal locations, or a combination thereof. An activity model may include records of information relating to the presence or characteristics of wildlife at or near a water-site. The activity model may be relied upon in generating map pins or other graphical representation of the underlying data relating to the wildlife activity.

At step 510, a feature model may be generated indicating an environmental feature associated with the water-site, wherein generating the dynamic map is based at least on the feature model and the dynamic map indicates one or more environmental features. The environmental feature may comprise submerged sand bars, shallow or un-navigable water, channels, hazardous areas, above water and underwater hazard areas, diving areas, choppy water, crowded areas where many boaters can be found, navigation buoys, or fallen structures or a combination thereof. A feature model may include records of information relating to the presence or characteristics of features at or near a water-site. The feature model may be relied upon in generating maps or other graphical representation of the underlying data relating to the features.

At step 512, the dynamic map may be transmitted to a user device configured to display the dynamic map via a user interface. The dynamic map may be periodically or continuously updated to illustrate changes in the map over a period of time.

Figure 6:
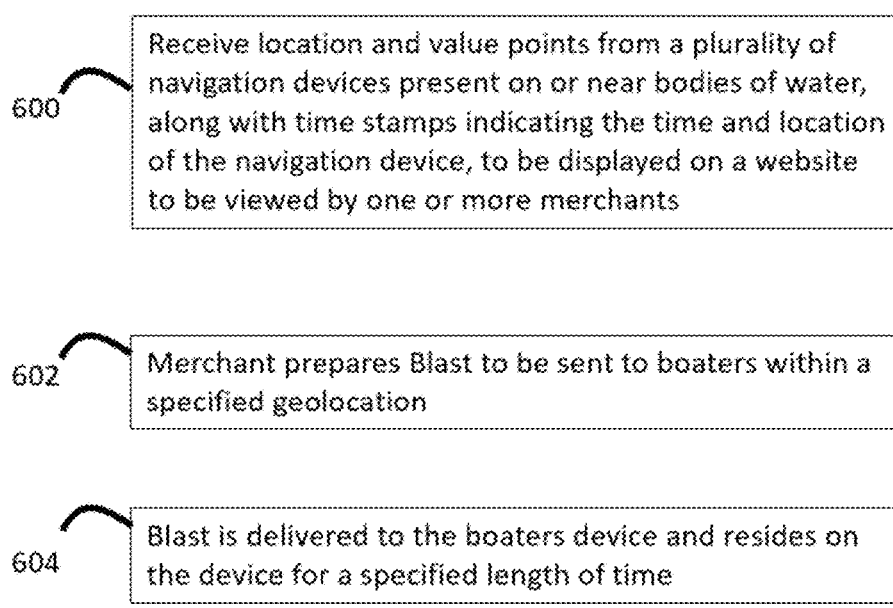
FIG. 6 illustrates an example method in accordance with aspects of the disclosure.

FIG. 6 illustrates a flow diagram for an example method. At step 600, location and value points may be received from a plurality of devices such as navigation device 110 (FIG. 1). The value points may include time stamps indicating the time the sending device was at the indicated location. The received information may be received and viewed by one or more merchants. In step 602, one or more of the merchants may prepare a blast to be sent to users (e.g., boaters) within a specific geolocation or range. In step 604, the blast may be delivered to the users for a determined period of time. The blast may include the location of the business on the lake, the name of the business, a photo or image uploaded by the business, the blast itself, which will be any information the vendor wants disseminated to the boaters or users near them, the time frame for which the blast is valid.

Figure 7:
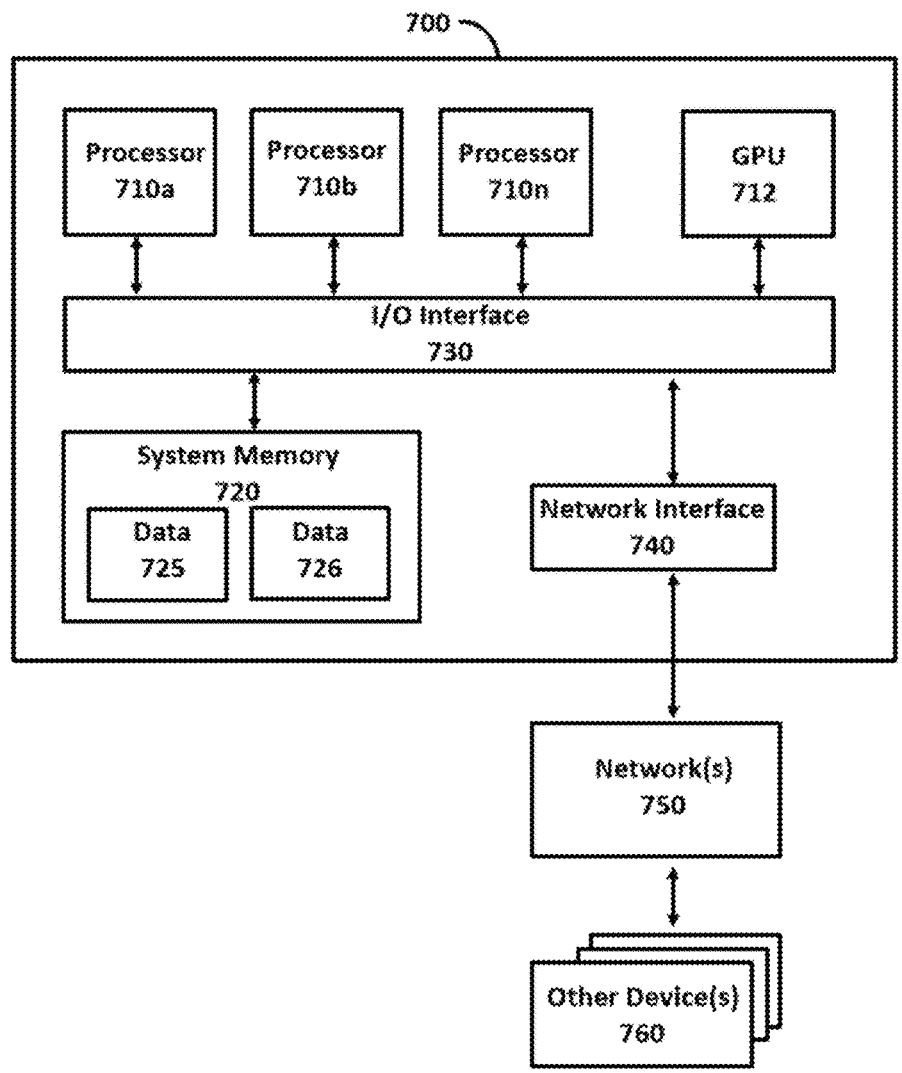
FIG. 7 is an exemplary computing device in accordance with aspects of the present disclosure.

FIG. 7 depicts a general-purpose computer system that includes or is configured to access one or more computer-accessible media. In the illustrated aspect, a computing device 700 may include one or more processors 710a, 710b and/or 710n (which may be referred herein singularly as the processor 710 or in the plural as the processors 710) coupled to a system memory 720 via an input/output (I/O) interface 730. The computing device 700 may further include a network interface 740 coupled to an I/O interface 730.

In various aspects, the computing device 700 may be a uniprocessor system including one processor 710 or a multiprocessor system including several processors 710 (e.g., two, four, eight, or another suitable number). The processors 710 may be any suitable processors capable of executing instructions. For example, in various aspects, the processor (s) 710 may be general-purpose or embedded processors implementing any of a variety of instruction set architectures (ISAs), such as the x86, PowerPC, SPARC, or MIPS ISAs, or any other suitable ISA. In multiprocessor systems, each of the processors 710 may commonly, but not necessarily, implement the same ISA.

In some aspects, a graphics processing unit ("GPU") 712 may participate in providing graphics rendering and/or physics processing capabilities. A GPU may, for example, include a highly parallelized processor architecture specialized for graphical computations. In some aspects, the processors 710 and the GPU 712 may be implemented as one or more of the same type of device.

The system memory 720 may be configured to store instructions and data accessible by the processor(s) 710. In various aspects, the system memory 720 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 720 as code 725 and data 726.

In one aspect, the I/O interface 730 may be configured to coordinate I/O traffic between the processor(s) 710, the system memory 720 and any peripherals in the device, including a network interface 740 or other peripheral interfaces. In some aspects, the I/O interface 730 may perform any necessary protocol, timing or other data transformations to convert data signals from one component (e.g., the system memory 720) into a format suitable for use by another component (e.g., the processor 710). In some aspects, the I/O interface 730 may include support for devices attached through various types of peripheral buses, such as a variant of the Peripheral Component Interconnect (PCI) bus standard or the Universal Serial Bus (USB) standard, for example. In some aspects, the function of the I/O interface 730 may be split into two or more separate components, such as a north bridge and a south bridge, for example. Also, in some aspects some or all of the functionality of the I/O interface 730, such as an interface to the system memory 720, may be incorporated directly into the processor 710.

The network interface 740 may be configured to allow data to be exchanged between the computing device 700 and other device or devices 760 attached to a network or networks 750, such as other computer systems or devices, for example. In various aspects, the network interface 740 may support communication via any suitable wired or wireless general data networks, such as types of Ethernet networks, for example. Additionally, the network interface 740 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 720 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 700 via the I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 700 as the system memory 720 or another type of memory. Further, a computer-accessible medium may include transmission media or signals, such as electrical, electromagnetic or digital signals, conveyed via a communication medium, such as a network and/or a wireless link, such as those that may be implemented via the network interface 740. Portions or all of multiple computing devices, such as those illustrated in FIG. 7, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed example aspects. The exemplary systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

We claim:

1. A method for dynamic map generation relating to a water-site, the method comprising:

receiving first water-site information from a first user observation input mobile device, the first water-site information comprising a first time marker indicating a time the first water-site information was captured by a user, a first location marker indicating a location of the first device at the time the first water-site information was captured by a user, and a first user inputted water parameter associated with the water-site;

receiving second water-site information from a second user observation input mobile device, the second water-site information comprising a second time marker indicating a time the second water-site information was captured by a user, a second location marker indicating a location of the second device at the time the second water-site information was captured by a user, and a second user inputted water parameter associated with the water-site;

generating a heat map based on at least the first and second water-site information indicating activity associated with the water-site, wherein the heat map indicates wildlife activity at a user selected time or over a time period defined by the user, or both; and distributing the heat map to the first and second user observation input mobile devices.

2. The method of claim 1, wherein the wildlife activity comprises animal schooling, fish spawning, bird and animal migrations, invasive wildlife intrusion or animal locations or a combination thereof.

3. The method of claim 1, further comprising generating a feature map indicating an environmental feature associated with the water-site, wherein generating the dynamic map is based at least on the feature map and the dynamic map indicates one or more environmental features.

4. The method of claim 3, wherein the environmental feature comprises submerged sand bars, shallow or un-navigable water, channels, hazardous areas, above water and underwater hazard areas, diving areas, choppy water, crowded areas where many boaters can be found, navigation buoys, or fallen structures, or a combination thereof.

5. The method of claim 1 further comprising transmitting the dynamic map to a user device configured to display the dynamic map via a user interface.

6. The method of claim 1, wherein the dynamic map indicates a location of at least the first user observation input device and the second user observation input device.

7. The method of claim 1, wherein the dynamic map indicates an identifier associated with at least the first user observation input device and the second user observation input device.

8. The method of claim 1, wherein the dynamic map indicates an identifier associated with a merchant located in proximity to the water-site.

9. A system for map creation for bodies of water, the system comprising: an application server associated with a plurality of user observation input devices, wherein the application server is configured:

(a) to receive user input data from said plurality of user observation input devices, the user input data including water-site information, time, and location points;

(b) to perform standard statistical data analysis on data received by said plurality of devices;

(c) to generate a dynamic map including one or more of the heat maps based at least on the standard statistical data analysis;

wherein said application server is configured to send messages to users of the plurality of user observation input devices based on the user's geolocation.

10. The system according to claim 9, wherein said application server is further configured to continuously update the dynamic map.

11. The system according to claim 9, wherein one of the plurality of user observation input devices is configured to receive and display the dynamic map created by the application server.

12. A method for dynamic map generation relating to a water-site, the method comprising, receiving first water-site information from a first user observation input device, the first water-site information comprising a first time marker indicating a time the first water-site information was captured by a user, a first location marker indicating a location of the first device at the time the first water-site information was captured by a user, and a first user inputted water parameter associated with the water-site;

receiving second water-site information from a second user observation input device, the second water-site information comprising a second time marker indicating a time the second water-site information was captured by a second user, a second location marker indicating a location of the second device at the time the second water-site information was captured by a second user, and a second user inputted water parameter associated with the water-site;

generating a heat map indicating wildlife activity over a user defined time period associated with the water-site, wherein the wildlife activity comprises animal schooling, fish spawning, bird and animal migrations, invasive wildlife intrusion, or animal locations, or a combination thereof;

generating a feature map indicating an environmental feature associated with the water-site, wherein the environmental feature comprises submerged sand bars, shallow or un-navigable water, channels, hazardous areas, above water and underwater hazard areas, diving areas, choppy water, crowded areas where many boaters can be found, navigation buoys, or fallen structures or combination thereof;

generating a dynamic map based at least on the heat map and the feature map, wherein the dynamic map indicates wildlife activity at a user defined time or over a user defined time period; and transmitting the dynamic map to a user device configured to display the dynamic map via a user interface.

* * * * *